(12) United States Patent
Katare et al.

(10) Patent No.: US 9,528,413 B2
(45) Date of Patent: Dec. 27, 2016

(54) SYNERGISTIC SCR/DOC CONFIGURATIONS FOR LOWERING DIESEL EMISSIONS

(75) Inventors: Santhoji Rao Katare, Tamilnadu (IN); Giovanni Cavataio, Dearborn, MI (US); Douglas Allen Dobson, Ypsilanti, MI (US); Gang Guo, Ann Arbor, MI (US); Paul M. Laing, Canton, MI (US); William Charles Ruona, Farmington Hills, MI (US); Paul Joseph Tennison, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 495 days.

(21) Appl. No.: 12/847,265

(22) Filed: Jul. 30, 2010

(65) Prior Publication Data

US 2011/0162347 A1    Jul. 7, 2011

(51) Int. Cl.
*F01N 3/10* (2006.01)
*F01N 3/20* (2006.01)
*F01N 13/00* (2010.01)

(52) U.S. Cl.
CPC ............ *F01N 3/2066* (2013.01); *F01N 3/10* (2013.01); *F01N 3/106* (2013.01); *F01N 13/009* (2014.06); *F01N 2610/02* (2013.01); *Y02T 10/24* (2013.01)

(58) Field of Classification Search
CPC .......... F01N 13/009; F01N 3/10; F01N 3/106; F01N 3/2066; F01N 2610/02; Y02T 10/24

USPC ................... 60/274, 286, 295, 297, 301, 311
See application file for complete search history.

(56) References Cited

U.S. PATENT DOCUMENTS

| | | | |
|---|---|---|---|
| 6,677,264 B1 * | 1/2004 | Klein et al. ..................... 502/74 |
| 6,871,489 B2 | 3/2005 | Tumati et al. | |
| 7,229,597 B2 * | 6/2007 | Patchett et al. ............... 422/177 |
| 2004/0237509 A1 | 12/2004 | Bhargava et al. | |
| 2006/0153761 A1 * | 7/2006 | Bandl-Konrad et al. .. 423/239.1 |
| 2007/0056263 A1 * | 3/2007 | Roach et al. .................... 60/272 |
| 2007/0125072 A1 | 6/2007 | McCarthy, Jr. et al. | |
| 2008/0184698 A1 * | 8/2008 | Igarashi ........................ 60/287 |
| 2009/0205322 A1 * | 8/2009 | Braun et al. ................... 60/286 |
| 2009/0293450 A1 * | 12/2009 | Gonze et al. ................... 60/274 |
| 2009/0320453 A1 * | 12/2009 | Salanta et al. ................. 60/282 |
| 2010/0043405 A1 * | 2/2010 | Tanai et al. ..................... 60/286 |
| 2010/0150800 A1 * | 6/2010 | Ikeda et al. ................. 423/213.5 |
| 2010/0180579 A1 * | 7/2010 | Huang et al. ................... 60/297 |
| 2011/0283680 A1 * | 11/2011 | Gekas et al. ................... 60/274 |

FOREIGN PATENT DOCUMENTS

WO    WO 2008026002 A1 *    3/2008    ............. B01D 53/94

* cited by examiner

*Primary Examiner* — Thomas Denion
*Assistant Examiner* — Matthew T Largi
(74) *Attorney, Agent, or Firm* — Julia Voutyras; Alleman Hall McCoy Russell & Tuttle LLP

(57) ABSTRACT

A motor-vehicle engine system comprises a first DOC configured to receive exhaust from an engine and an SCR device coupled downstream of the first DOC in a flow direction of the exhaust. The system further comprises a second DOC coupled downstream of the SCR device. The system takes advantage of hydrocarbon sorption in the SCR catalyst that is a function of temperature to enable reduced hydrocarbon emissions via oxidation at the second DOC.

19 Claims, 10 Drawing Sheets

SYNERGISTIC SCR/DOC CONFIGURATIONS FOR LOWERING DIESEL EMISSIONS

TECHNICAL FIELD

This application relates to the field of motor-vehicle emissions control, and more particularly, to removal of nitrogen oxides (NOX) and non-methane hydrocarbons (NMHC) from diesel-engine exhaust.

BACKGROUND AND SUMMARY

A motor-vehicle engine system may include a series of exhaust-aftertreatment devices that suppress feed gas emissions from an engine. These may include a nitrogen-oxide (NOX) trap, a diesel-type oxidation catalyst (DOC), a diesel-type particulate filter (DPF), and/or a selective catalytic reduction (SCR) device for reducing NOX.

Such devices may be arranged differently in different motor-vehicle exhaust systems. For example, U.S. Pat. No. 7,229,597 describes a diesel-engine exhaust system in which a DOC is arranged upstream of an SCR device. In U.S. 2007/0125072, a DOC is arranged downstream of an SCR device. Neither configuration may be suitable, however, for meeting increasingly strict emissions-control requirements with regard to NOX and non-methane hydrocarbons (NMHC). For example, the partial-zero-emission vehicle (PZEV) standard for light-duty diesel trucks tolerates no more than 0.02 grams NOX per mile and 0.01 grams NMHC per mile at 150,000 miles. A single DOC arranged in a diesel-engine exhaust system may have difficulty keeping NMHC below these levels, due mainly to excessive transmission of NMHC during cold-start conditions.

The inventors herein have recognized this issue and now disclose a series of approaches to address it. One embodiment provides a motor-vehicle engine system comprising a first DOC configured to receive exhaust from an engine, and an SCR device coupled downstream of the first DOC in a flow direction of the exhaust. The SCR device is configured to sorb a hydrocarbon at a lower temperature and release the hydrocarbon at a higher temperature. The system further comprises a second DOC coupled downstream of the SCR device. The second DOC is configured to oxidize the hydrocarbon. This novel configuration provides multiple distinct synergies. For example, much of the NMHC that slips past the first DOC may be temporarily stored in the SCR device until the second DOC has reached its light off temperature. By the time the NMHC is released from the SCR device, the second DOC will be sufficiently heated to provide effective NMHC control.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted herein.

DETAILED DESCRIPTION

Figure 1:
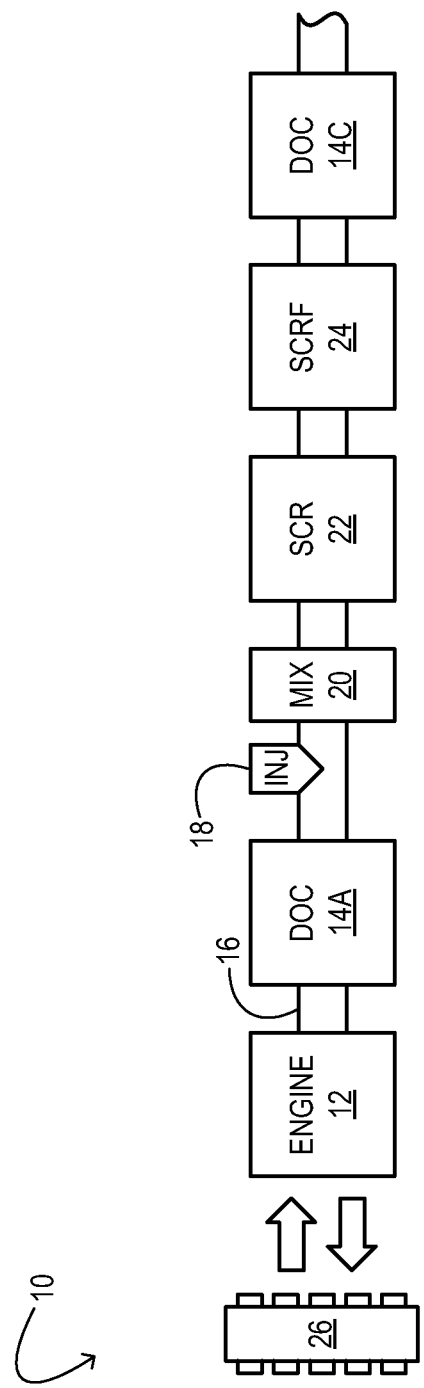
FIG. 1 schematically shows aspects of an example motor-vehicle engine system in accordance with an embodiment of this disclosure.

The subject matter of this disclosure is now described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 schematically shows aspects of an example engine system 10 in one embodiment. The system may be installed in a motor vehicle; it includes engine 12, configured to provide motive force to drive the motor vehicle. Engine 12 may be a fuel-efficient, lean-burning, diesel engine—a supercharged or turbocharged diesel engine in some examples. To generate motive force, the engine admits air from the atmosphere, admits diesel fuel, and combusts the air and diesel fuel in one or more combustion chambers. The engine also releases from the combustion chambers an engine feed gas—i.e., the exhaust produced in the combustion. Such exhaust may include components undesirable for discharge into the ambient: NOX, CO, soot, methane, and NMHC, for example. Accordingly, engine system 10 includes a series of exhaust-aftertreatment devices configured to receive exhaust from the engine.

Engine system 10 includes DOC 14A coupled to exhaust conduit 16, downstream of engine 12 in the direction of the engine exhaust flow. DOC 14A comprises an internal catalyst-support structure to which a DOC washcoat is applied. Accordingly, DOC 14A is configured to oxidize residual CO, hydrogen, methane, and NMHC present in the engine exhaust. In one embodiment, DOC 14A may be between 25% and 150% of the engine-swept volume (ESV) in capacity. The cell density of DOC 14A may be 600 cells per square inch (cpsi) with a wall thickness of 0.003 inches, or 400 cpsi with a wall thickness of 0.004 inches, for example. In one embodiment, the substrate of DOC 14A may support a washcoat of 0.5 to 5 grams per cubic inch (gci) with a platinum-group metal (PGM) loading between 15 and 210 grams per cubic foot (gcf). The PGM may include platinum only, platinum/palladium mixtures in ratios ranging from 20:1 to 1:10, or palladium only. In other embodiments, other transition metals such as gold or rhodium may be used as catalysts; further, alkali and/or alkaline earth metals such as potassium, strontium, and barium may be added to enhance the DOC function.

Continuing in FIG. 1, reductant injector 18, reductant mixer 20, and SCR device 22 are coupled downstream of DOC 14A in engine system 10. The reductant injector is configured to receive a reductant (e.g., a urea solution) from a reservoir and to controllably inject the reductant into the exhaust flow. The reductant injector may include a nozzle that disperses the reductant solution in the form of an aerosol. Arranged downstream of the reductant injector, reductant mixer 20 is configured to increase the extent and/or homogeneity of the dispersion of the injected reductant in the exhaust flow. The reductant mixer may include one or more vanes configured to swirl the exhaust flow and entrained reductant to improve the dispersion. Upon being dispersed in the hot engine exhaust, at least some of the injected reductant may decompose. In embodiments where the reductant is a urea solution, the reductant will decompose into water, ammonia, and carbon dioxide. The remaining urea will decompose on impact with the SCR device (vide infra).

SCR device 22 is coupled downstream of reductant mixer 20. The SCR device may be configured to facilitate one or more chemical reactions between ammonia formed by the decomposition of the injected reductant and NOX (e.g., nitric oxide and nitrogen dioxide) from the engine exhaust, thereby reducing the amount of NOX released into the ambient. The SCR device comprises an internal catalyst-support structure to which an SCR washcoat is applied. The SCR washcoat is configured to sorb the NOX and the ammonia, and to catalyze the redox reaction of the same to form dinitrogen ($N_2$) and water. In one embodiment, SCR device 22 may be between 50% and 250% ESV in capacity. The cell density of this SCR device may be 400 cpsi with a wall thickness of 0.004 inches. The washcoat loading may be 0.5 to 5.0 gci, with the washcoat comprising a zeolite—e.g., Chabazite, beta, y, ZSM5, or combinations thereof—and base metals copper, iron, cerium, or manganese, or combinations thereof.

In engine system 10, SCR filter (SCRF) device 24 is coupled downstream of SCR device 22. The SCRF device comprises a soot-filtering substrate suitable for trapping soot entrained in the exhaust flow. Applied to the substrate is a washcoat having SCR-type catalytic activity at least over certain regions of the substrate. Accordingly, the SCRF device provides SCR functionality and ammonia slip control, in addition to trapping soot from the exhaust flow.

The washcoat of SCRF device 24 also promotes oxidation of the accumulated soot and recovery of filter capacity at least under certain conditions. In one embodiment, soot accumulated in SCRF device 24 may be subject to intermittent oxidizing conditions, where engine 12 is adjusted to temporarily provide higher-temperature exhaust. In another embodiment, the accumulated soot may be oxidized continuously or quasi-continuously during normal operating conditions of the engine. In one embodiment, SCRF device 24 may be between 50% and 250% ESV in capacity. The cell density of the SCRF device may be 300 cpsi with a wall thickness of 0.012 inches, for example. In one embodiment, the washcoat loading of the SCRF device may be 0.1 to 3 gci on a high-porosity (HP) substrate.

Although FIG. 1 shows SCR device 22 coupled immediately upstream of SCRF device 24, it will be understood that various other embodiments are contemplated as well. For example, the SCR and SCRF devices may be arranged in the opposite order, other structure may be coupled between them, or SCR device 22 may be omitted from the engine system.

Under some conditions, the combination of exhaust after-treatment devices described thus far may not provide the desired level of emissions control. Such conditions may include cold-start, where a significant amount of NMHC could be transmitted through DOC 14A before the oxidation catalyst in the DOC reaches its light-off temperature. The inventors herein have observed that a suitably configured SCR washcoat, when cold, has a high affinity for NMHC: during some cold-start conditions, an SCR or SCRF device may store more than 50 percent of the total NMHC emissions from the engine. Accordingly, in the embodiment shown in FIG. 1, NMHC transmitted through DOC 14A may be stored by the SCR device 22 and/or SCRF device 24. When the temperature of these devices increases due to sustained exhaust flow, stored NMHC desorbs from the SCR washcoats and re-enters the exhaust flow. To this end, the SCR washcoats in these devices may be configured to sorb NMHC at a lower temperature (e.g., a cold-start temperature, <70° C., etc.) and release the NMHC at a higher temperature (e.g., a normal diesel-engine exhaust temperature, >150° C., etc.). Absent further measures, the desorbed NMHC would be released into the ambient, degrading the emissions-control performance of the engine system. Further, the delayed aspect of NMHC release could make the emissions-control performance of the engine system appear worse than it actually is. This is because some emissions-testing procedures apply a greater weight to NMHC released after the warm up period ("bag 2'") than to NMHC released during the warm-up period ("bag 1").

To address these issues and provide tighter control of NMHC emissions, engine system 10 includes DOC 14C. In one embodiment, DOC 14C may be between 10% and 100% ESV in capacity. The cell density of this DOC may be 600 cpsi with a wall thickness of 0.003 inches. In one embodiment, the substrate of DOC 14C may support a washcoat loading of 0.1 to 3 gci. In one embodiment, the washcoat of DOC 14C may be substantially as described for DOC 14A. In another embodiment, the washcoat of DOC 14C may comprise a lower relative amount of PGM, a different PGM, or even a non-PGM catalyst. Thus, the overall PGM content of DOC 14C and/or the loading with respect to any PGM element may be significantly lower than that of DOC 14A.

Coupling DOC 14C downstream of SCRF device 24 provides more than an additive advantage for control of NMHC emissions. This is because DOC 14C is effectively guarded from excessive, cold-start NMHC, CO and NOX by virtue of the NOX-control properties and NMHC-absorbing character of the SCR catalysts arranged upstream, as well as the light-off characteristics of DOC 14A. Because the oxidation-catalyst washcoat in DOC 14C is never exposed to high concentrations of NMHC, CO, or NOX, it lights off at a much lower temperature than DOC 14A. Therefore, by the time the stored NMHC is released from SCR device 22, DOC 14C may already be heated to a temperature where prompt oxidation of the NMHC occurs.

Continuing in FIG. 1, engine system 10 includes electronic control system 26. The electronic control system may include any controller or combination of controllers of the motor vehicle in which the engine system is installed. The electronic control system may be operatively coupled to various engine-system components (valves, pumps, fuel injectors, heaters, etc.) and configured to actuate or adjust these components to enact various engine-system control functions, including the control functions described herein. To assess operating conditions in connection with various control functions, the electronic control system may be operatively coupled to a plurality of sensors arranged throughout the engine system—flow sensors, temperature sensors, pedal-position sensors, pressure sensors, etc. In some embodiments, any or all of the exhaust-aftertreatment devices described herein may include a temperature sensor and a heater. The electronic control system may be configured to function in a closed-loop manner, actuating the heater to provide heat when the temperature of the aftertreatment device is below a pre-determined threshold.

Figure 2:
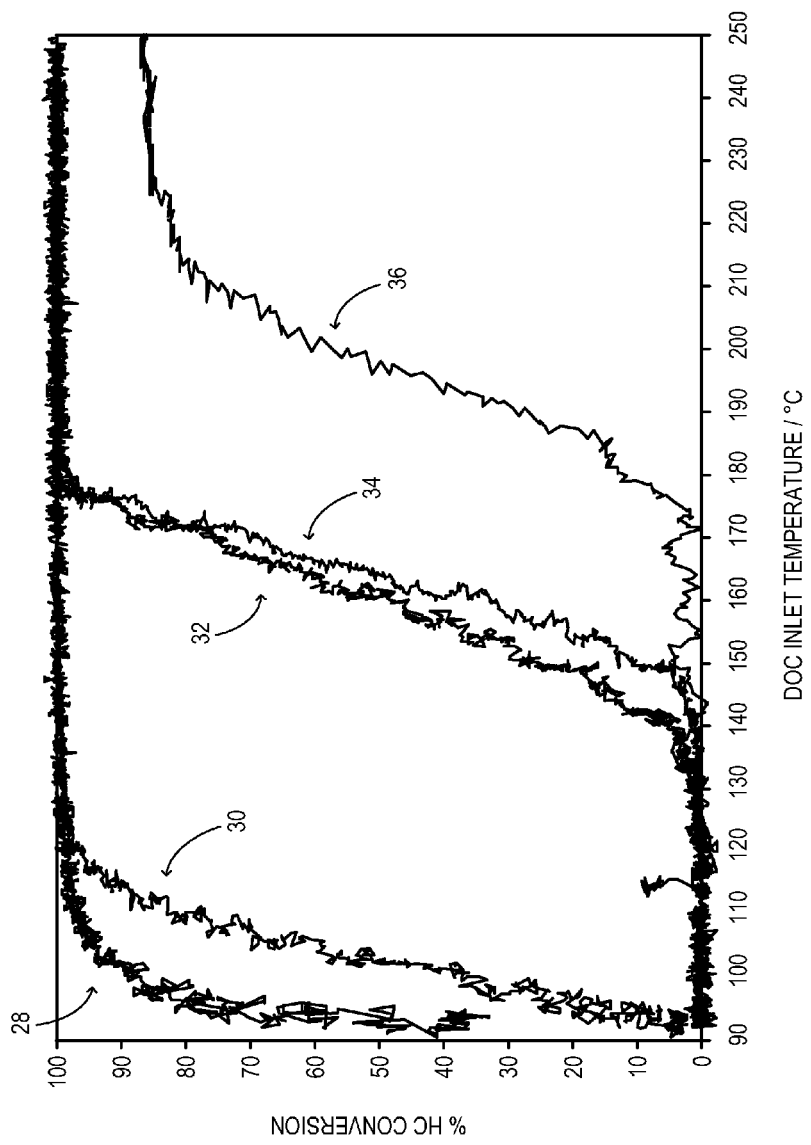
FIG. 2 is a graph of flow-reactor test data in which percent hydrocarbon conversion is plotted against DOC inlet temperature for different feed-gas compositions.

FIG. 2 shows a graph of flow-reactor test data that supports the inventors' approach. The graph plots percent hydrocarbon conversion versus DOC inlet temperature for different compositions of engine feed gas. A DOC having a 105 gcf PGM washcoat was used for this test. After ageing for 80 hours at 800° C. (to simulate 150,000 miles of wear), the DOC was provided the feed gas at a space velocity of 50,000 reciprocal hours. Graph 28 was recorded using a feed gas 250 parts per million (ppm) in propylene and no CO or NOX. Under these conditions, T50, defined as the DOC inlet temperature at which fifty percent of the NMHC is oxidized, is 90° C. Graph 30 was recorded under similar conditions, but using 1000 ppm propylene; here T50 increases to over 100° C. Graphs 32 and 34 show the effect of an additional 2000 ppm CO relative to the conditions used for graphs 28 and 30, respectively. Graph 36 shows the effect of an additional 1000 ppm CO and 400 ppm NO relative to the conditions used for graph 34. Such conditions further increase T50, making the DOC less able to control NMHC emissions at relatively low exhaust temperatures.

Figure 3:
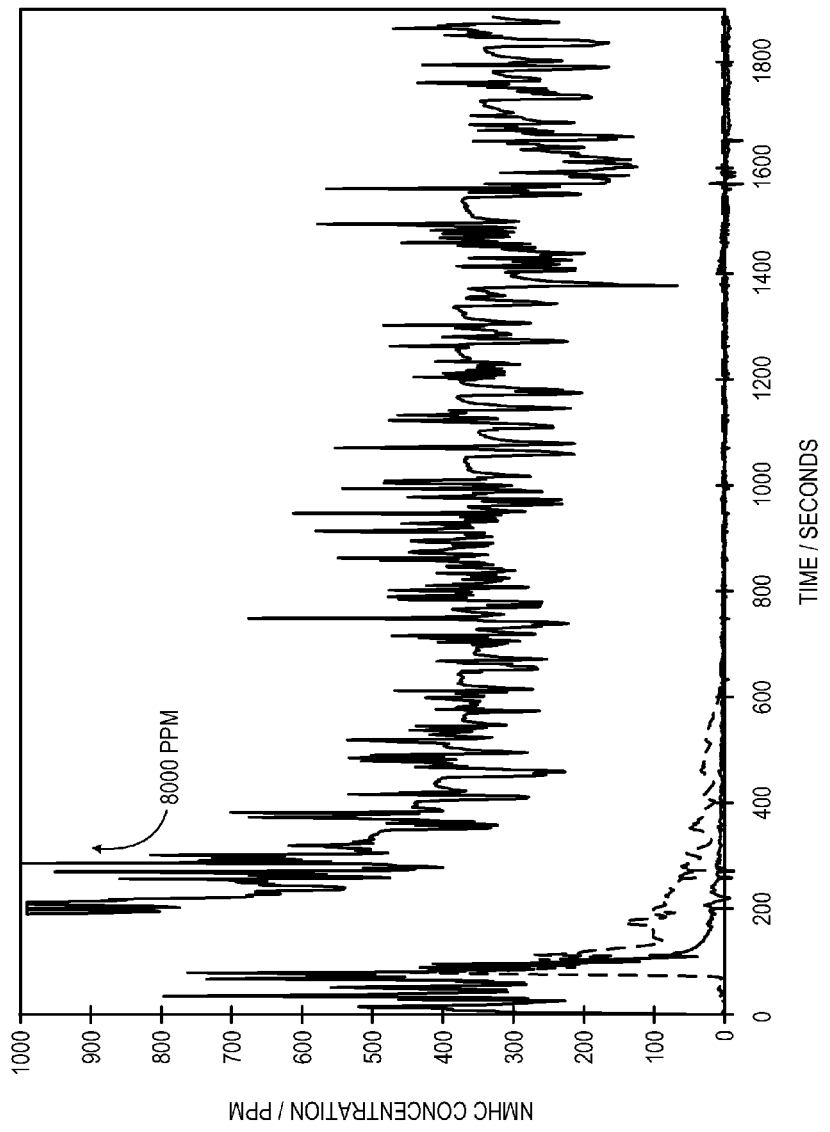
FIG. 3 is a graph comparing a feed-gas NMHC concentration to NMHC concentrations measured immediately downstream of a DOC and immediately downstream of an SCRF coupled downstream of the DOC.
Figure 4:
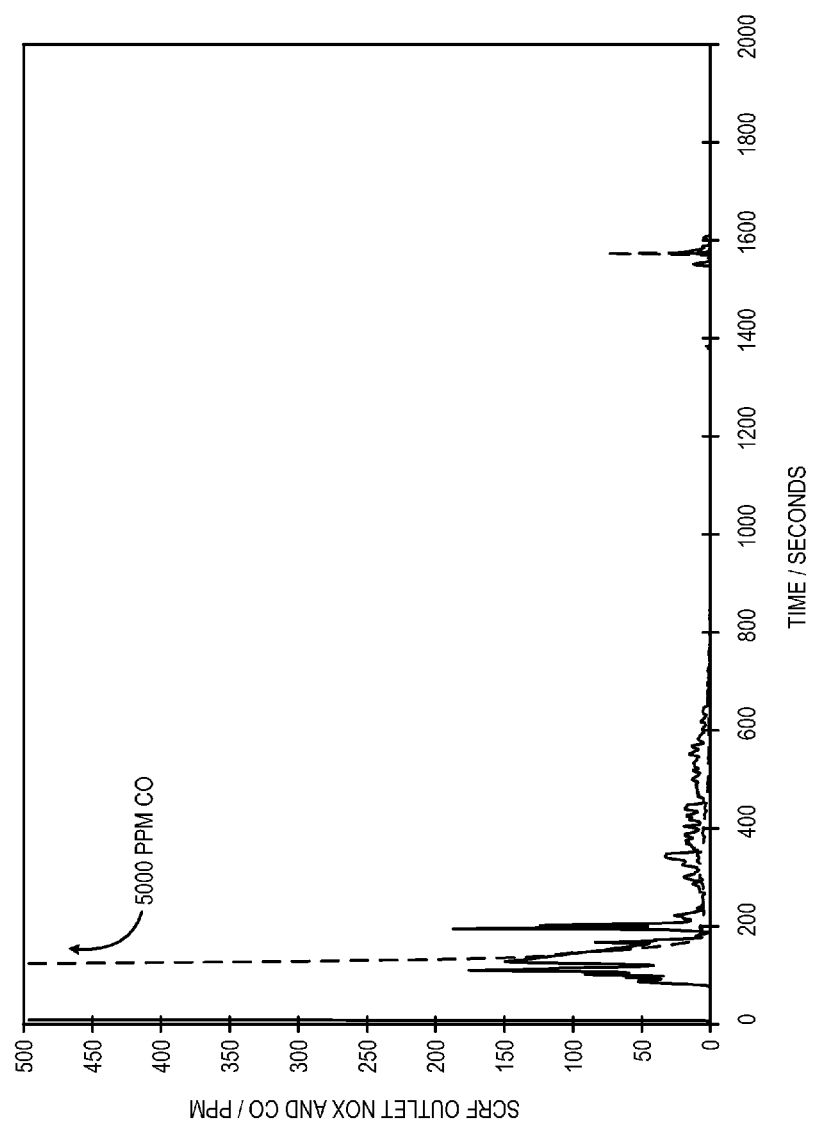
FIG. 4 is a graph showing NOX and carbon monoxide (CO) concentrations measured immediately downstream of an SCRF coupled downstream of a DOC.

The graphs of FIGS. 3 and 4 show that relatively low concentrations of NMHC, CO, and NOX are available downstream of a DOC-SCRF configuration. FIG. 3 compares a feed-gas NMHC concentration (upper graph, solid line) to concentrations measured immediately downstream of a DOC (lower graph, solid line) and immediately downstream of an SCRF device coupled downstream of the DOC (lower graph, dashed line). The graph shows post-SCRF NMHC concentrations less than 100 ppm after 100 seconds of exhaust flow, even with feed gas concentrations in excess of 8000 ppm. FIG. 4 shows NOX (solid line) and CO (dashed line) concentrations measured immediately downstream of an SCRF device coupled downstream of a DOC. The graph shows post-SCRF NOX and CO concentrations less than 200 ppm each after 100 seconds of exhaust flow.

Figure 5:
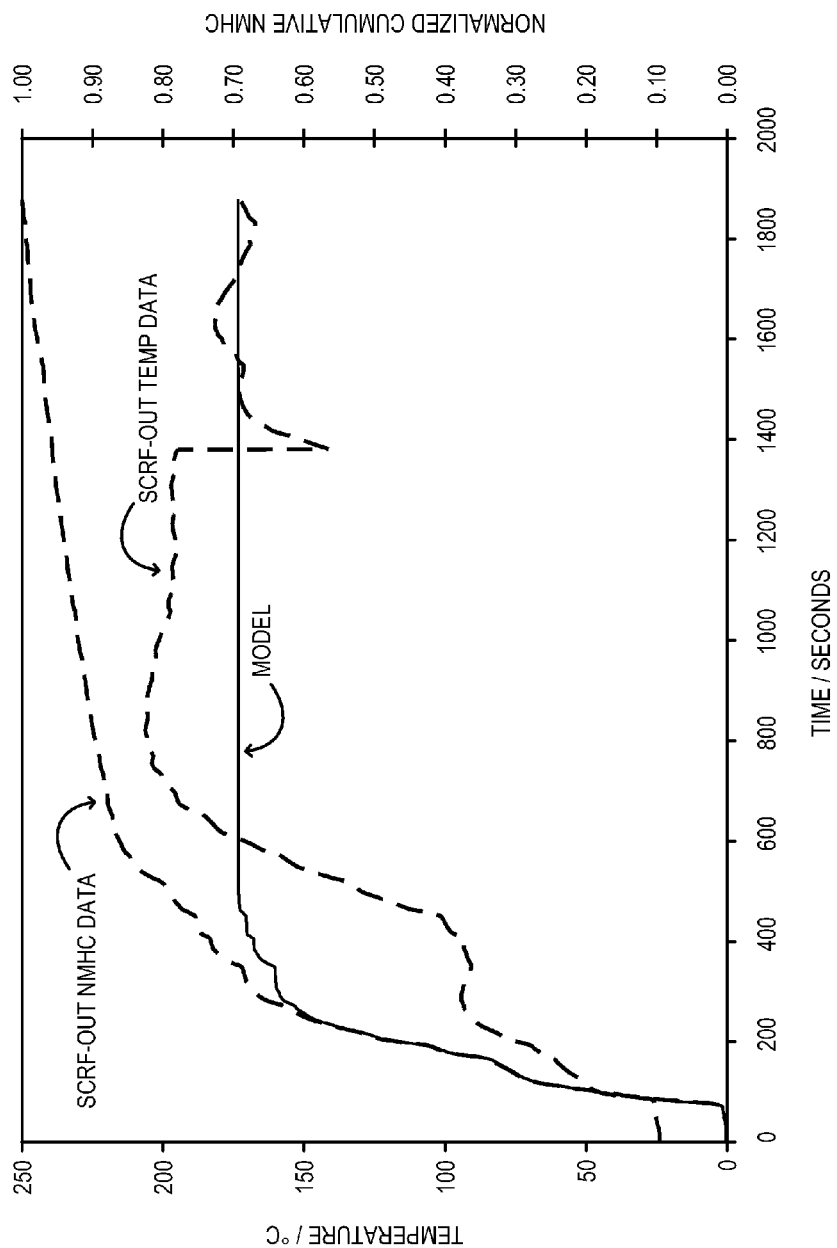
FIG. 5 is a graph of a mathematical modeling result predicting the efficiency of a DOC-SCRF-DOC configuration in accordance with an embodiment of this disclosure.

Taken together, the data presented in FIGS. 2 through 4 suggest that SCR device 22 and/or SCRF device 24 of engine system 10 will store cold-start NMHC from engine 12 and release it only after DOC 14C has lighted off, providing improved control of NMHC emissions. FIG. 5 provides further evidence. It shows with a mathematical model projection (solid line) in which a 105 gram per cubic foot (gcf) post-SCRF DOC is predicted to reduce tailpipe NMHC by 30 percent. The model is based on actual temperature and NMHC concentration data measured at the outlet of an SCRF device (shown in dashed lines).

A key enabler of the proposed solution is storage of NMHC on an SCR catalyst under cold-start conditions and release of the NMHC at higher temperatures. The NMHC-storing ability is a characteristic of the zeolite in the SCR washcoat. The primary function of this zeolite is to store ammonia for NOX reduction. However, the zeolite composition and its amount could potentially be modified to store increasing amounts of NMHC during cold-start conditions. Thus, one or more SCR devices in engine system 10 may comprise a washcoat configured for enhanced sorption of NMHC. Further, a significant increase in DOC performance at lower overall cost is possible by matching the optimum PGM level in upstream and/or downstream DOC's to the optimum composition and amount of zeolite in the SCR washcoat.

Optimization may further include tuning the zeolite to sorb NMHC such that the desorption temperature of the NMHC is similar to the light-off temperature of the downstream DOC. In this way, the SCR washcoat will not hold the NMHC longer than needed. Optimization may further include controlling the amount of NMHC sorbed to preserve the zeolite's ability to sorb ammonia for efficient NOX reduction, and, to avoid large exotherms under drop-to-idle conditions. Such exotherms could potentially lower NOX-control performance in the SCR washcoat. In some embodiments, controlling the amount of NMHC sorbed in the SCR washcoat may comprise varying the relative affinity of the zeolite for polar (e.g., ammonia, NOX) versus nonpolar (e.g. NMHC) constituents, by altering the zeolite composition.

Figure 6:
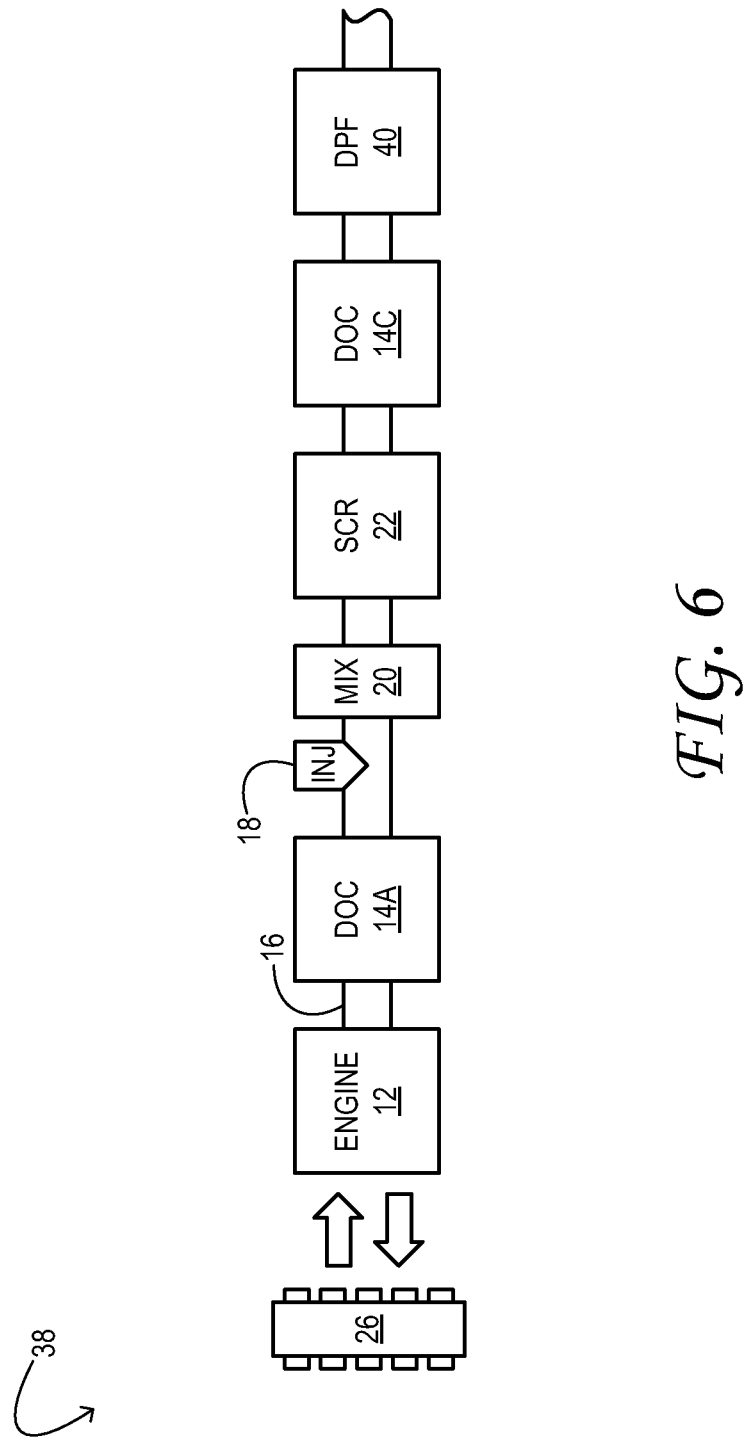
FIG. 6 schematically shows aspects of another example motor-vehicle engine system in accordance with an embodiment of this disclosure.

In embodiments that include an SCRF device—engine system 10, for example—the downstream DOC is arranged downstream of the SCRF device, where it cannot oxidize the ammonia being supplied to the SCRF device. In embodiments that include a traditional DPF, however, the downstream DOC could be placed upstream of the DPF. Engine system 38 of FIG. 6 shows one such embodiment. In this system, SCRF device 24 is omitted, and DPF 40 is coupled downstream of DOC 14C.

Figure 7:
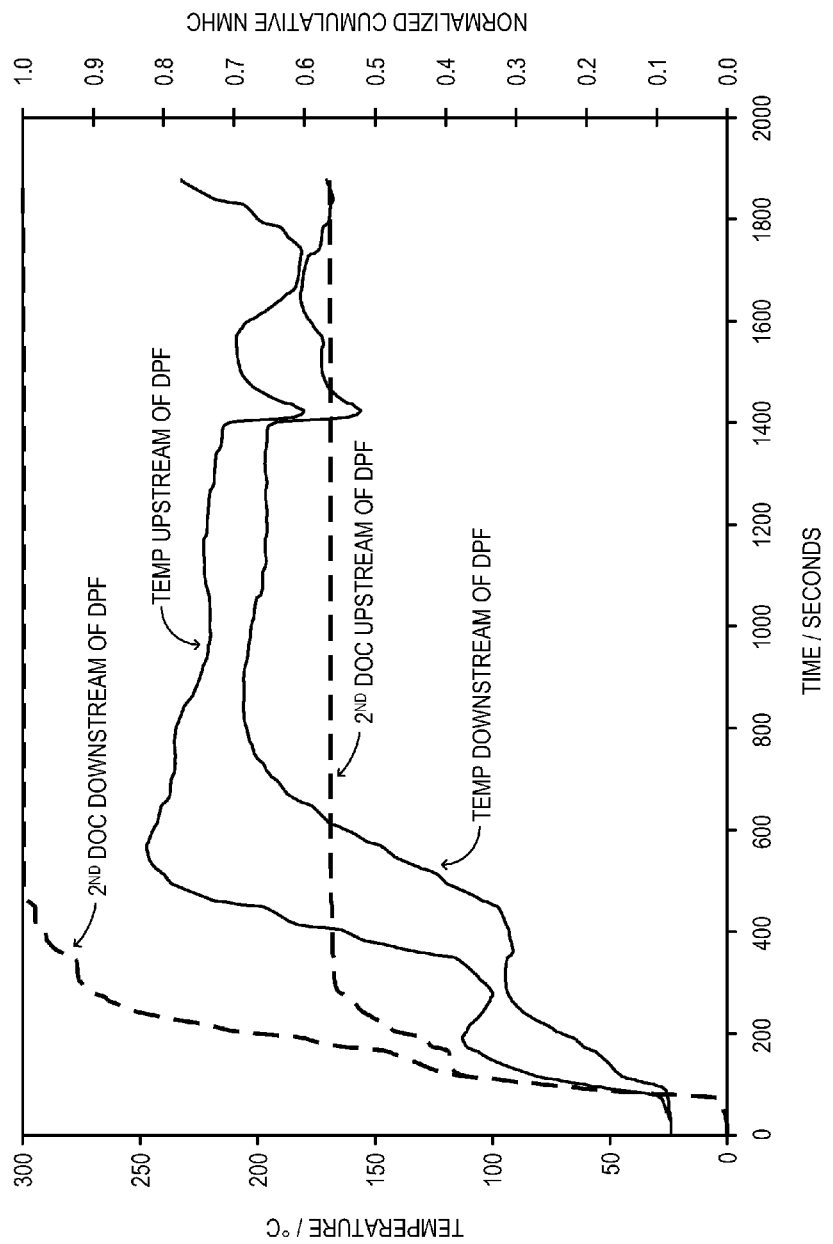
FIG. 7 is a graph of a mathematical modeling result predicting the efficiency of a DOC-SCR-DOC-DPF configuration in accordance with an embodiment of this disclosure.

DPF 40 of engine system 38 is a regenerable soot filter configured to trap soot entrained in the engine exhaust flow; accordingly, it comprises a soot-filtering substrate. Applied to the substrate is a washcoat that promotes oxidation of the accumulated soot and recovery of filter capacity under certain conditions. In one embodiment, the accumulated soot may be subject to intermittent oxidizing conditions in which engine 12 is adjusted to temporarily provide higher-temperature exhaust. In another embodiment, the accumulated soot may be oxidized continuously or quasi-continuously during normal operating conditions of the engine. In one embodiment, DPF 40 may be between 100% and 250% ESV in capacity. The cell density of the DPF may be 200 cpsi with a wall thickness of 0.018 inches, or 300 cpsi with a wall thickness of 0.012 inches, for example. In one embodiment, a washcoat loading of 0.1 to 2 gci may be supported on a standard-porosity (SP) substrate. The PGM loading of the washcoat may be between 0 and 210 gcf in platinum, palladium, or platinum/palladium mixtures in ratios between 20:1 and 1:10. The configuration of engine system 38 ensures that the inlet temperature to DOC 14C is not affected by the thermal inertia of DPF 40, resulting in better NMHC conversion. The dashed graphs in FIG. 7 compare mathematical-model projections for the configuration of FIG. 6 (lower graph, dashed line) versus a similar system in which the DOC 14C is arranged downstream of DPF 40 (upper graph, dashed line). The projections are based on 4.4-liter vehicle feed conditions. They show a 44 percent improvement in NMHC conversion due to the placement of the DOC upstream as opposed to downstream of the DPF. The model is based on actual temperature and NMHC concentration data measured at the outlet of an SCRF device (temperatures shown in solid lines).

One challenge of placing the DOC upstream of the DPF is that it may be subjected to relatively high temperatures, especially during DPF regeneration conditions. Therefore, the oxidation catalyst should be robust enough to maintain its light-off behavior despite periodic high-temperature excursions. In one embodiment, a DOC robust enough to withstand 700° C. regeneration conditions without compromising its NMHC light-off behavior may be used upstream of the DPF. In other embodiments, a DOC that is not as robust but has better NMHC light-off performance at a lower inlet temperatures may be used downstream of an SCRF device. In one embodiment, the high-temperature durability of a DOC may be enhanced by incorporation of a relatively high PGM dispersion with an adequate washcoat layer to minimize PGM migration due to sintering. In another embodiment, the high-temperature durability may be enhanced by addition of binders—e.g., titanium, tungsten, zinc, zirconium, and/or cerium. A thin-wall DOC could be used especially at the post-SCRF location in order to reduce thermal inertia and thereby enhance light-off behavior.

In some embodiments where pre- and post-SCR DOC's are included, PGM levels in the pre-SCR DOC may be reduced for cost advantage. Decreasing PGM in the upstream DOC may significantly reduce its light-off potential and increase the HC slip. However, as shown in FIG. 3, this HC slip, especially during cold-start conditions, may be effectively stored in one or more SCR washcoats. When the exhaust temperature increases, the stored NMHC is released from the SCR washcoats and oxidized by the downstream DOC.

Figure 8:
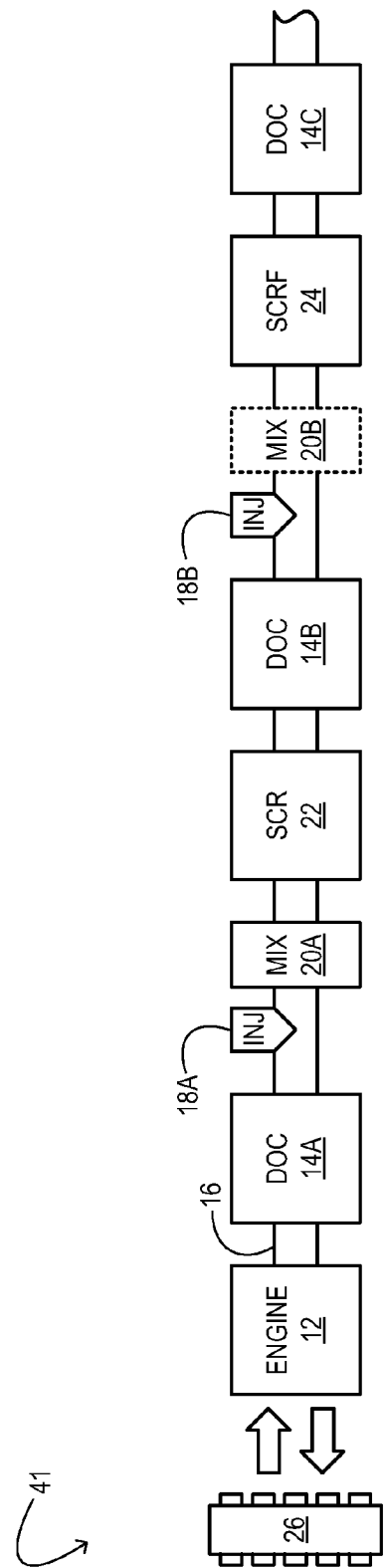
FIG. 8 schematically shows aspects of another example motor-vehicle engine system in accordance with an embodiment of this disclosure.

FIG. 8 schematically shows aspects of another example engine system 41 in one embodiment. System 41 differs from system 10 in that additional DOC 14B and additional reductant injector 18B are coupled between SCR device 22 and SCRF device 24. The additional DOC in system 41 may enable still tighter control of hydrocarbon emissions. In this embodiment, DOC 14C will receive NMHC released from SCR 22 and SCRF device 24 in the absence of CO. It will therefore light off at a much lower temperature. Further, the reductant injector 18B ensures that SCRF device 24 has sufficient reductant to keep NOX emissions to a very low level. In one embodiment, reductant injector 18B may be configured to inject gaseous ammonia instead of urea, in which case it may be coupled directly upstream of SCRF device 24. This configuration significantly reduces the thermal inertia upstream of SCRF device 24 and DOC 14C, enabling these catalysts to light off sooner, for improved NMHC and NOX control. In yet another embodiment, reductant injector 18B may be configured to inject urea, and mixer 20B may be coupled between the injector and the SCRF device.

The configurations described above enable various methods for controlling emissions from a motor-vehicle engine system. Accordingly, some such methods are now described, by way of example, with continued reference to above configurations. It will be understood, however, that the methods here described, and others fully within the scope of this disclosure, may be enabled via other configurations as well. The methods presented herein may include various measuring and/or sensing events enacted via one or more sensors disposed in the engine system. The methods may also include various computation, comparison, and decision-making events, which may be enacted in an electronic control system operatively coupled to the sensors. The methods further include various hardware-actuating events, which the electronic control system may command selectively, in response to the decision-making events.

Figure 9:
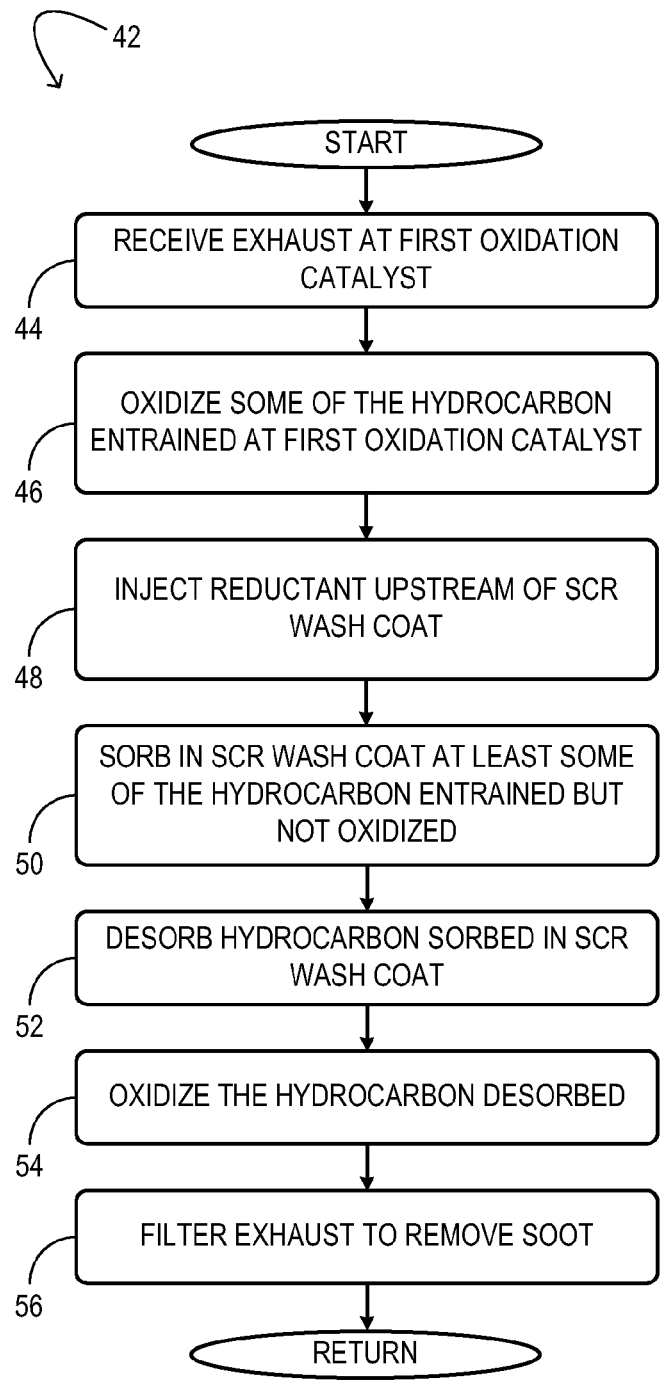
FIGS. 9 and 10 illustrate example methods for controlling emissions from a motor-vehicle engine system in accordance with embodiments of this disclosure.

FIG. 9 illustrates an example method 42 for controlling emissions from a motor-vehicle engine system in one embodiment. At 44 exhaust is received at a first oxidation catalyst. The exhaust may entrain hydrocarbons such as NMHC. At 46 some of the hydrocarbon entrained at first oxidation catalyst is oxidized. At 48 a reductant such as urea is injected into the exhaust flow upstream of an SCR washcoat. At 50 at least some of the hydrocarbon entrained but not oxidized at the first oxidation catalyst is sorbed in the SCR washcoat. At 52 the hydrocarbon sorbed in the SCR washcoat is desorbed. At 54 the desorbed hydrocarbon desorbed is oxidized.

In one embodiment, the desorbed hydrocarbon may be oxidized at a second oxidation catalyst. Further, such oxidation may include an intermediate step of sorbing at least some of the desorbed hydrocarbon in a second SCR washcoat, desorbing the hydrocarbon, and oxidizing at least some of the desorbed hydrocarbon at a third oxidation catalyst. In this embodiment, ammonia may be injected into the exhaust upstream of the second SCR washcoat.

At 56, the exhaust is filtered to remove soot. In the embodiment illustrated in FIG. 9, the exhaust is filtered after the desorbed hydrocarbon is oxidized. In other embodiments, however, the exhaust may be filtered before the desorbed hydrocarbon is oxidized. In particular, filtering the exhaust may comprise passing the exhaust over an SCR washcoat arranged in an SCRF filter device. This device may be arranged upstream of the second oxidation catalyst, as described hereinabove. From 56 the method returns.

Method 42 illustrates one approach for controlling emissions from a motor-vehicle engine system by sorbing NMHC in an SCR washcoat, desorbing, and oxidizing in a downstream DOC. In other embodiments, the overall emissions-control approach may be tailored to different exhaust temperatures depending on vehicle operating conditions. Thus, in addition to the passive function of the SCR and DOC described above, the thermal behavior of the system may be more actively managed in a number of ways. For example, reductant injection may be increased during cold-start conditions to reduce overtemperature of the downstream DOC. As another example, engine injection timing or spark timing may be adjusted to control inlet temperature to the downstream DOC based on an estimated amount of NMHC storage in an SCR washcoat.

In some embodiments, the zeolite in the SCR washcoat and the PGM content of the post-SCR DOC's afford additional modes of control. By varying the zeolite amount and composition, the temperature at which NMHC is released may be controlled. Simultaneously, by varying the amount of PGM on the post-SCR DOC's, the temperature at which NMHC released from the SCR is oxidized on the DOC's may be aligned with the release temperature.

In other embodiments, any of the exhaust-aftertreatment devices here disclosed may be electrically heated using a glow plug or external burner, for example. This approach allows active control of the storage of the NMHC on the SCR washcoat, its release from the washcoat, and oxidation over the downstream DOC.

Figure 10:
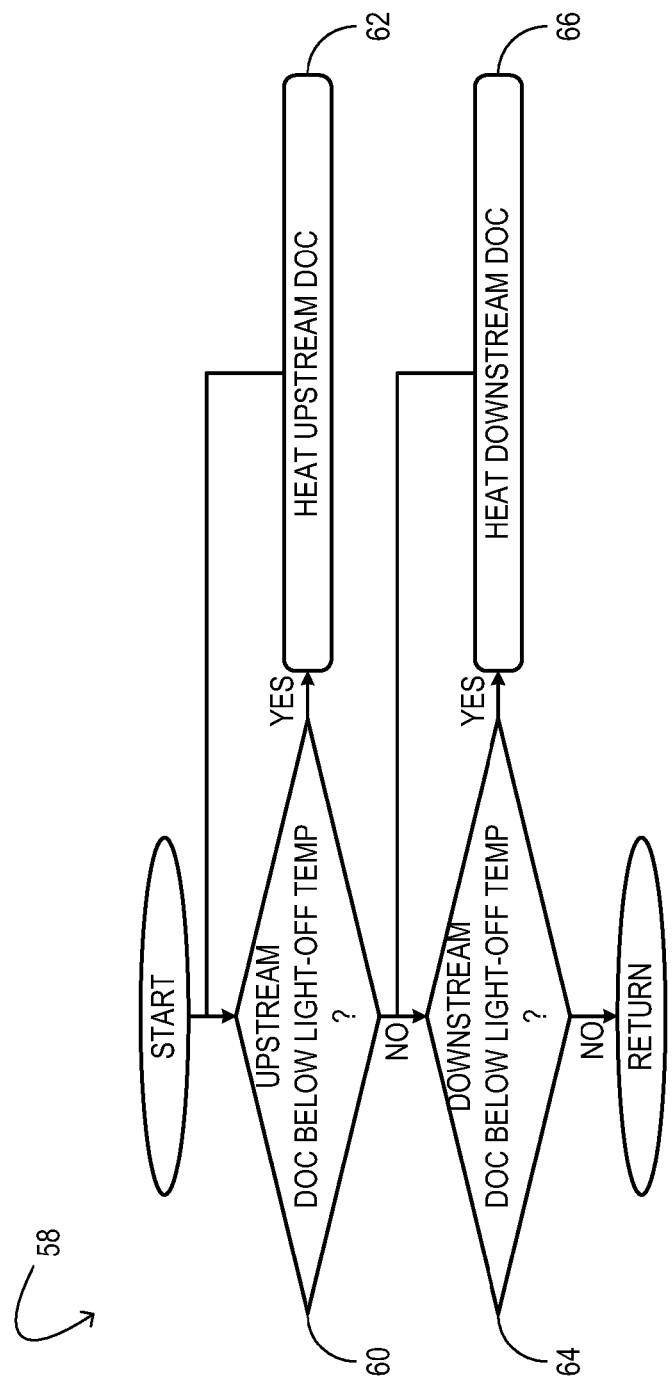

FIG. 10 illustrates an example method 58, providing one embodiment of this approach. At 60 it is determined whether upstream DOC is below its light-off temperature. The determination may be made directly—by interrogating a temperature sensor—or indirectly, based on a model that factors in various operating states of the engine system. If the upstream DOC is below its light-off temperature, then the method advances to 62; otherwise the method advances to 64. At 62 the upstream DOC is heated. The DOC may be heated via a glow plug or burner, or, in one embodiment, the DOC may be heated by adjusting engine operating conditions to increase the exhaust temperature. At 64 it is determined, as described hereinabove, whether downstream DOC is below its light-off temperature. If the downstream DOC is below its light-off temperature, then the method advances 66; otherwise the method returns. At 66 the downstream DOC is heated—via a glow plug or burner, for example. From 64, method 58 returns.

In the method described above, engine-system heating resources are applied first to the upstream DOC, neglecting the downstream DOC. This strategy is based on the ability of the SCR washcoat to sorb any NMHC that slips past the upstream DOC while the upstream DOC is warming up. Depending on the details of the engine system, this period may be quite short, as the upstream DOC is also receiving heat directly from the exhaust flow. Then, once the upstream DOC reaches its light-off temperature, the heating resources are switched over to the downstream DOC to shorten its time to light off. It will be noted that this approach runs contrary to the notion that the more downstream exhaust-aftertreatment components receive the highest heating priority.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. An engine system comprising:
a first DOC receiving engine exhaust;
a zeolite SCR device coupled downstream of the first DOC in an exhaust flow direction;
a second DOC coupled downstream of the SCR device, having a lower platinum-group metal loading than the first DOC and a light-off temperature aligned with a desorption temperature of the SCR device, the light-off temperature of the second DOC lower than a light-off temperature of the first DOC;
an SCR-type soot filter downstream of the SCR device and upstream of the second DOC;
a urea injector coupled between the SCR device and the first DOC; and
a control system including a non-transient, computer-readable medium including instructions for:
if a temperature of the first DOC is below a light-off temperature of the first DOC, applying engine-system heating resources to the first DOC and neglecting the second DOC; and then
once the first DOC reaches the light-off temperature of the first DOC, switching over the engine-system heating resources to the second DOC if a temperature of the second DOC is below the light-off temperature of the second DOC.

2. The engine system of claim 1 further comprising a third DOC coupled downstream of the SCR device and upstream of the soot filter.

3. The engine system of claim 2 further comprising a second reductant injector coupled downstream of the third DOC.

4. The engine system of claim 3, wherein the urea injector is configured to inject urea and the second reductant injector is configured to inject ammonia, and wherein the second reductant injector is coupled directly upstream of the soot filter.

5. The engine system of claim 1, wherein the SCR device has a cell density of 400 cpsi with a wall thickness of 0.004 inches, the SCR device further having a washcoat loading between 0.5 to 5.0 gci, with the washcoat comprising a zeolite and base metals copper, iron, cerium, or manganese, or combinations thereof.

6. The engine system of claim 1, wherein the engine is a diesel engine, and wherein the control system further includes instructions for adjusting engine injection timing to control an inlet temperature of the second DOC based on an estimated amount of NMHC storage in an SCR washcoat of the SCR device.

7. The engine system of claim 1, wherein the second DOC is a thin-wall DOC.

8. The engine system of claim 1, wherein applying engine-system heating resources to the first DOC comprises heating the first DOC with a glow plug or burner, or adjusting engine operating conditions to increase exhaust temperature.

9. The engine system of claim 1, wherein switching over the engine-system heating resources to the second DOC comprises heating the second DOC with a glow plug or burner.

10. A motor-vehicle engine system comprising:
an engine;
a first DOC configured to receive exhaust from the engine;
an injector coupled downstream of the first DOC in a flow direction of the exhaust and configured to inject urea into the exhaust;
an SCR device coupled downstream of the injector, the SCR device configured to sorb a hydrocarbon at a lower temperature and release the hydrocarbon at a higher temperature, the SCR device between 50% and 250% swept volume of the engine in capacity and comprising a washcoat loading of 0.5 to 5.0 grams per cubic inch, the washcoat comprising zeolite;
a second DOC coupled downstream of the SCR device, the second DOC configured to oxidize the hydrocarbon and having a light-off temperature at the higher temperature, the light-off temperature of the second DOC lower than a light-off temperature of the first DOC, the first DOC between 25% and 150% swept volume of the engine in capacity and comprising a washcoat loading of 0.5 to 5 grams per cubic inch with a platinum-group metal content between 15 and 210 grams per cubic foot, and the second DOC between 10% and 100% swept volume of the engine in capacity and comprising a washcoat loading of 0.1 to 3 grams per cubic inch with a platinum-group metal content less than that of the first DOC;
an SCR soot filter coupled downstream of the SCR device and upstream of the second DOC, configured to remove soot from the exhaust; and
a control system including a non-transient, computer-readable medium including instructions for:
if a temperature of the first DOC is below the light-off temperature of the first DOC, applying engine-system heating resources to the first DOC and neglecting the second DOC; and then once the first DOC reaches the light-off temperature of the first DOC, switching over the engine-system heating resources to the second DOC if a temperature of the second DOC is below the light-off temperature of the second DOC.

11. The engine system of claim 10 further comprising a reductant mixer upstream of the SCR device and downstream of the injector, the mixer configured to increase the extent and/or homogeneity of a dispersion of injected urea in exhaust flow, the mixer including one or more vanes configured to swirl the exhaust flow and entrained reductant.

12. A method for controlling emissions from a motor-vehicle engine system, the method comprising:

during a cold engine start, receiving exhaust at a first oxidation catalyst, the exhaust entraining a hydrocarbon;

if a temperature of the first oxidation catalyst is below a light-off temperature of the first oxidation catalyst, applying engine-system heating resources to the first oxidation catalyst and neglecting a second oxidation catalyst coupled downstream of the first oxidation catalyst, the second oxidation catalyst having a light-off temperature lower than the light-off temperature of the first oxidation catalyst;

oxidizing at the first oxidation catalyst some of the hydrocarbon entrained;

once the first oxidation catalyst reaches the light-off temperature of the first oxidation catalyst, switching over the engine-system heating resources to the second oxidation catalyst if a temperature of the second oxidation catalyst is below the light-off temperature of the second oxidation catalyst;

sorbing in an SCR zeolite washcoat at least some of the hydrocarbon entrained but not oxidized at the first oxidation catalyst below and only until reaching the light-off temperature of the second oxidation catalyst;

desorbing the hydrocarbon sorbed in the SCR zeolite washcoat when the temperature of the second oxidation catalyst is above the light-off temperature of the second oxidation catalyst;

oxidizing the hydrocarbon desorbed in the second oxidation catalyst, the second oxidation catalyst having a lower platinum-group metal loading than the first oxidation catalyst.

13. The method of claim 12 further comprising filtering the exhaust to remove soot at an SCR filter with an SCR washcoat coupled upstream of the second oxidation catalyst.

14. The method of claim 13, wherein filtering the exhaust comprises passing the exhaust over an SCR washcoat, and wherein the exhaust is filtered before the desorbed hydrocarbon is oxidized.

15. The method of claim 13, wherein filtering the exhaust comprises filtering after the desorbed hydrocarbon is oxidized.

16. The method of claim 12 further comprising injecting a reductant into the exhaust upstream of the SCR zeolite washcoat.

17. The method of claim 12 further comprising injecting gaseous ammonia directly upstream of the SCR zeolite washcoat.

18. The method of claim 12, wherein oxidizing the desorbed hydrocarbon further comprises sorbing at least some of the desorbed hydrocarbon in a second SCR washcoat, desorbing, and oxidizing at least some of the desorbed hydrocarbon at a third oxidation catalyst.

19. The method of claim 18 further comprising injecting ammonia into the exhaust upstream of the second SCR washcoat.

* * * * *